US006545261B1

(12) United States Patent
Blake et al.

(10) Patent No.: US 6,545,261 B1
(45) Date of Patent: Apr. 8, 2003

(54) FIBER OPTIC ALIGNMENT SYSTEM AND METHOD

(76) Inventors: James N. Blake, 9232 N. Invergordon Rd., Paradise Valley, AZ (US) 85253; Alexander A. Tselikov, 42930 Corte Habana, Fremont, CA (US) 94539

( * ) Notice: Subject to any disclaimer, the term of this patent is extended or adjusted under 35 U.S.C. 154(b) by 0 days.

(21) Appl. No.: 09/650,573

(22) Filed: Aug. 30, 2000

Related U.S. Application Data (60) Provisional application No. 60/151,683, filed on Aug. 31, 1999.

(51) Int. Cl.[7] ................................................. G01B 9/10
(52) U.S. Cl. .................. 250/227.27; 250/573; 356/483; 356/477
(58) Field of Search ........................... 250/573, 227.19, 250/227.27; 356/460, 483, 450, 464, 477

(56) References Cited

U.S. PATENT DOCUMENTS 5,202,745 A * 4/1993 Sorin et al. .................. 356/479
6,205,266 B1 * 3/2001 Palen et al. .................... 385/15

OTHER PUBLICATIONS

R. de Carvalho and J. Blake, "Slow–flow measurements and fluid dynamics analysis using the Fresnel drag effect", App. Opt.., vol. 33, pp. 6073–6077, 1994.*

Application of a Sagnac Interferometer for Flow, Magnetic Field, and Rotatoion Sensing, Dissertation by Alexander Tselikov, Aug. 1998, UMI Microform 9903216.

* cited by examiner

Primary Examiner—Stephone Allen
Assistant Examiner—Bradford Hill
(74) Attorney, Agent, or Firm—Robert A. Pajak (57) ABSTRACT

A method and system for aligning optical fibers includes aperturing the optical beams from the optical fibers at two points along a path. Photodetectors are placed on the apertures and the positions of the tips of the optical fibers are controlled using actuators to center the optical beams within the apertures.

25 Claims, 10 Drawing Sheets

Fresnel Drag Flow Probe

Figure 1

Diffraction Limited Fluid Flow/ Light Wave Interaction Pipe

Figure 2

Fresnel Drag Flow Probe

Figure 3

Raw Data Showing Output For 24 Nanoliter Per Second
( 1 drop/ 30min) Flow Rate. $T_C = 3sec.$ (12dB/octive roll-off)

Figure 4

Sensor Output vs. Flow Rate

Figure 5

Experimental Setup For Monitoring The Plant Growth

Figure 6

Water Consumption Of An Onion Bulb

Figure 7

Automatic Alignment Principal Diagram

Figure 8

Representation Of The System Used To Calculate The Amplitude TransferFunction

Figure 9

Folded Configuration Of Time Domain Reflectometer

Figure 10
Time Domain Interferometer

Figure 11

Gas Flow Meter Sagnac Interferometer With The
Loop Broken In The Middle

Figure 12

Sensor Output vs. Flow Rate Measured By A Comercial Flow Meter

Figure 13

Transverse Velocity Profile For Different Flow Rates

FIBER OPTIC ALIGNMENT SYSTEM AND METHOD

This application claims the benefit of provisional application No. 60/151,683, filed Aug. 31, 1999.

TECHNICAL FIELD OF THE INVENTION

This invention relates generally to fiber optics, and particularly, to a fiber optic alignment system and method.

BACKGROUND OF THE INVENTION

In a 1993 a paper entitled "A Fresnel Drag Flow Meter," written by R. deCarvalho and J. Blake of Texas A&M University, and W. Sorin of Hewlitt Packard Laboratories, a new method of measuring fluid flow using a fiber optic Sagnac interferometer was described [1]. The principle of operation is that light travels faster with a flowing material than against it. A Sagnac interferometer was used to measure the time difference it took for light to travel around a closed loop, part of which contained the flowing material.

Two problems were found to exist in this flow meter which had to be overcome in order for it to become practical. First, the light has to be taken out of the optical fiber and passed as an optical beam through the flowing material. Then this light has to be refocused back into the optical fiber. The alignment requirements to accomplish this are excessively delicate, especially when the distance between the fiber tips is long. Second, the flow meter was found to give false readings due to time varying turbulence in the flowing material.

One method for achieving automatic alignment is to continuously move a fiber tip in a circular motion and then position the tip so as to minimize the intensity modulation of the light collected by the receiving fiber. However, this method requires measurement of the light collected by the receiving fiber.

SUMMARY OF THE INVENTION

Accordingly, a need has arisen for a fiber optic alignment system and method. The present invention provides a fiber optic alignment system and method that addresses shortcomings of prior system and methods.

According to one embodiment of the present invention, a fiber optic alignment system for guiding light beams through a flow and back into the optical fibers is illustrated in FIG. 7a. Light travels both ways through the flow. Because of reciprocity, when the system is well aligned, the light beams traveling in the two directions overlaps in space. To ensure that the counter propagating waves overlap in space, it is sufficient to ensure that they overlap at two distinct points along the z-axis since two points determine a line. This overlap can be accomplished by aperturing the light waves at two points along the path, such as with lenses, placing photodetectors on the apertures, and then controlling the positions of the fiber tips using PZT actuators to center the optical beams within the apertures. An exemplary realization of the photodetector arrangement for detecting the position of the light beam is shown in FIG. 7b. If equal amounts of light falls onto the two photodetectors placed along the Y or X axis, the error signal controlling the position of the fiber in the corresponding plane is zero. FIG. 7b also shows the relative position of the light beam and the photodetectors as well as the corresponding error signal versus the displacement in the X and Y directions in the case where the feedback loop is open. The position of the fiber on the left is controlled by the detectors on the aperture on the right, while the position of the fiber on the right is controlled by the detectors on the aperture on the left.

Figure 9:
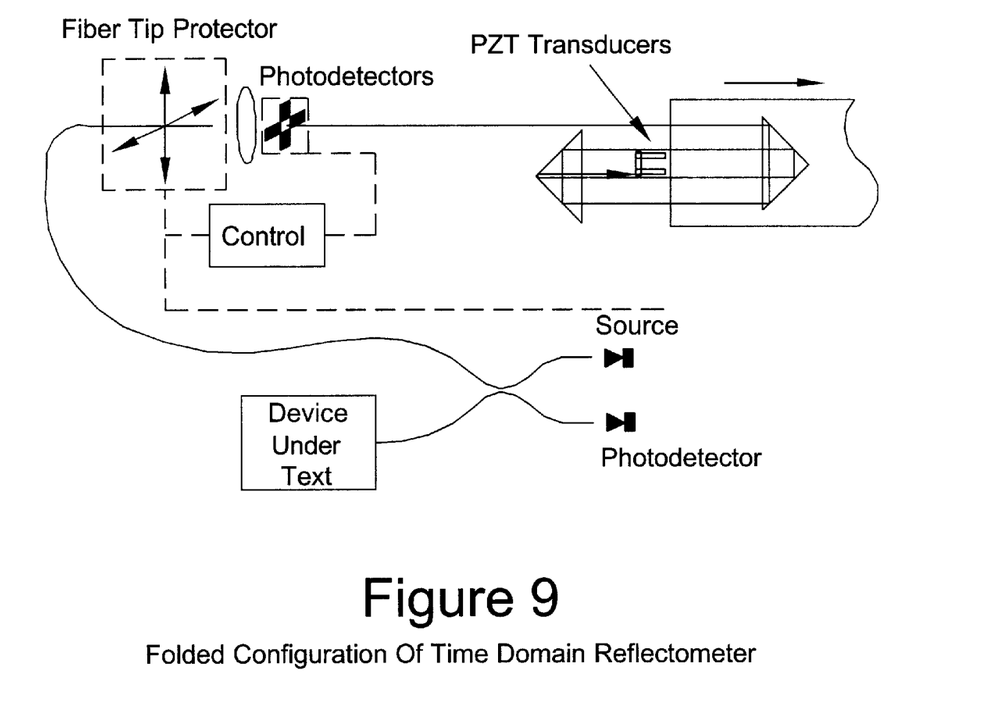
FIG. 9 is a diagram illustrating folded configuration of time domain reflectometer.
Figure 10:
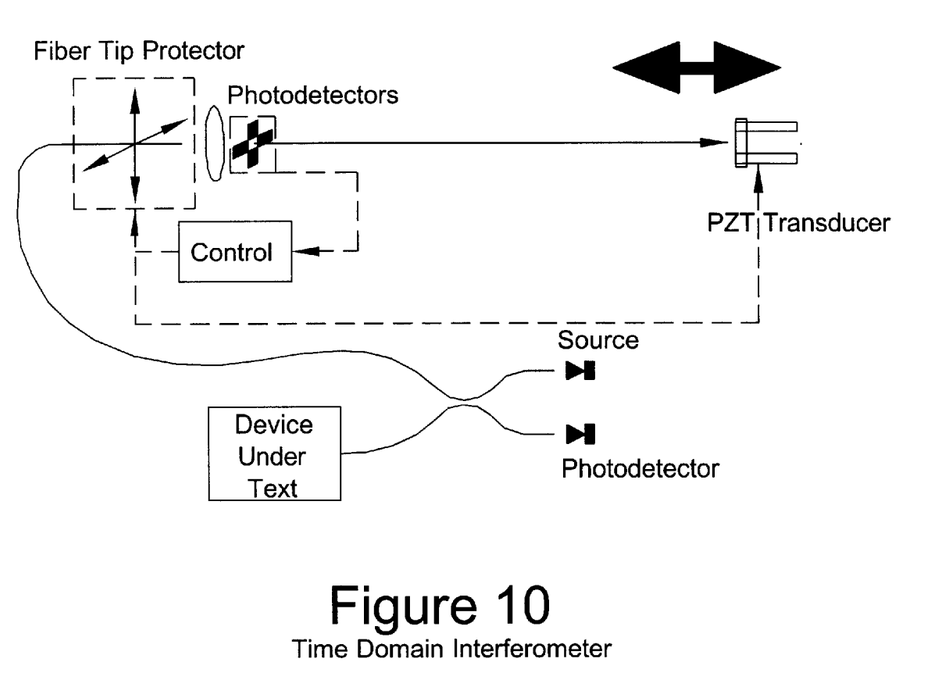
FIG. 10 is a diagram illustrating time domain interferometer.

FIGS. 9 and 10 illustrate a fiber optic alignment system in accordance with the teachings of the present invention used with coherence domain reflectometers. In this example, it is necessary to have light exit an optical fiber, propagate to a mirror, reflect back to the fiber and then re-enter the fiber. As in the system described above, the alignment will be good when the reflected light overlaps the outgoing light. This can be accomplished by positioning the fiber tip such that the outgoing light overlaps the incoming light at one point in the z-axis. The second overlap point is guaranteed to exist at the mirror. Thus, one aperture and detector set which measures the spatial position of the incoming light beam placed near the fiber tip is used to control the position of the fiber tip as shown in FIGS. 9 and 10. In addition to that, the position of the mirror can be controlled keeping it perpendicular to the light beam using PZT transducers.

Figure 11:
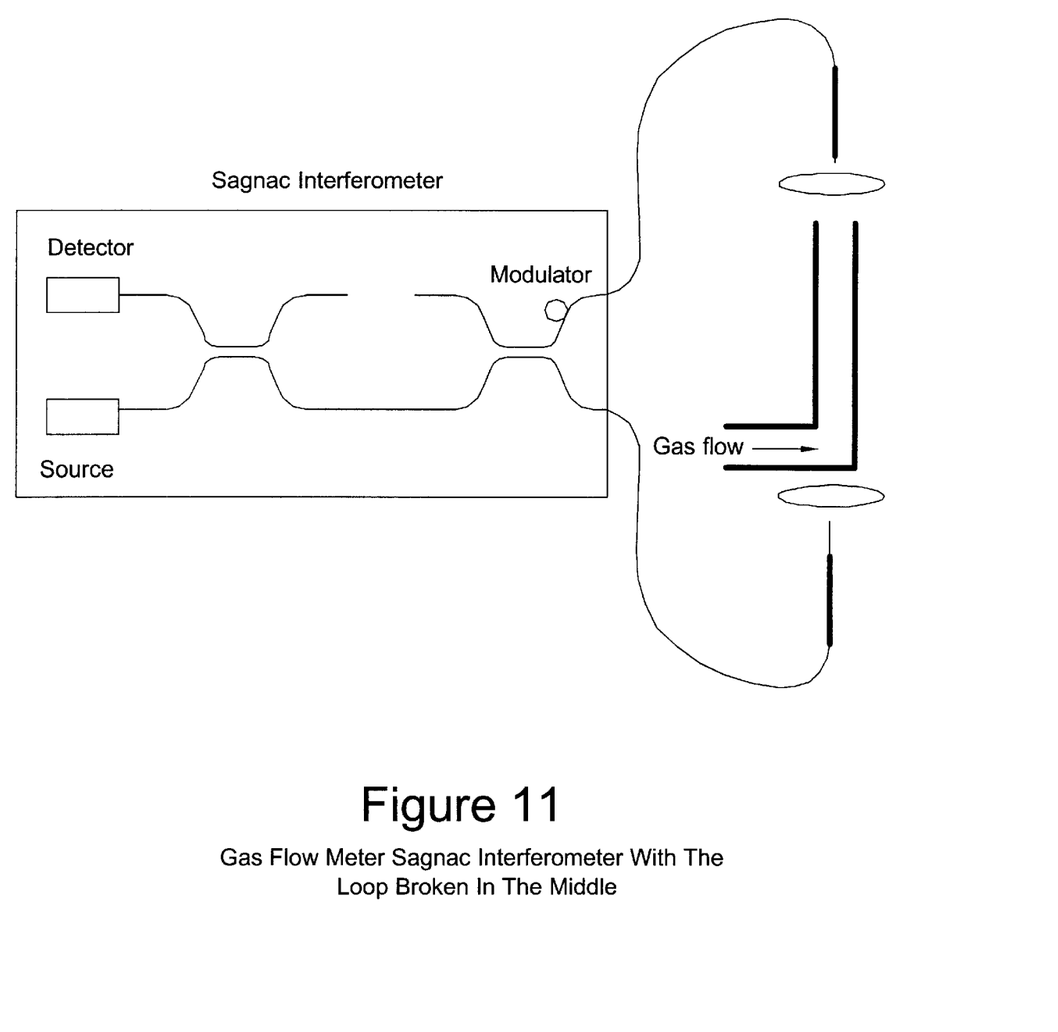
FIG. 11 is a diagram illustrating the gas flow meter Sagnac interferometer with the loop broken in the middle.

According to another embodiment of the present invention, a fiber optic alignment system used with a Sagnac interfermoter flow meter where the loop is broken at or near its middle is illustrated in FIG. 11. In this example, errors caused by time dependent changes in the flow rate are alleviated as both optical beams pass the flow at the same time.

Technical advantages of the present invention include providing an automatic fiber optic alignment system to achieve an ultra sensitive flow meter capable of measuring in real time volumetric flow rates as low as a few nanoliters per second. The achieved sensitivity are several orders of magnitude higher than prior volumetric flow sensors. The present invention has applications in a variety of areas such as biology, medicine or chemistry. The present invention also includes an automatic alignment system in order to make the flow meter practical, especially for the applications where air flow is to be monitored.

Other technical advantages will be readily apparent to one skilled in the art from the following figures and descriptions.

BRIEF DESCRIPTION OF THE DRAWINGS

For a more complete understanding of the present invention and the advantages thereof, reference is now made to the following description taken in conjunction with the accompanying drawings, in which.

DETAILED DESCRIPTION OF THE INVENTION

PART I—INTRODUCTION

A. MOTIVATION

The true reciprocal configuration of a Sagnac interferometer makes it a very convenient tool for measuring various parameters. The initial motivation of this work is to use the Sagnac interferometer principle to build different sensors. Since the output of the sensor is non zero only in the presence of a non reciprocal effect, such unwanted perturbations on the system as temperature or ambient pressure are in common mode with the respect to the interfering waves and are greatly rejected by the interferometer. As a result, these sensors have an excellent sensitivity and stability. Most of our experiments have been carried out using a properly modified commercially available open loop Honeywell gyroscope.

B. SUMMARY

In Part II, we describe a new type of optical flow meter system based on measuring the Fresnel drag, using a Sagnac interferometer. The application of the Fresnel drag to measuring flow rates is based on the fact that the phase velocity of an optical beam going with the flow is speeded up while the phase velocity of the beam traveling against the flow is slowed down by the same amount. The phase shift induced by the Fresnel drag accumulated over an interaction length is non-reciprocal and therefore can be measured very accurately using a Sagnac Interferometer. This phase shift can be connected to different parameters of the flowing material such as the volumetric flow rate. For a given minimum detectable phase shift of the Sagnac interfermoter the maximum sensitivity, in measuring a volumetric flow rate can be achieved if the dimensions of the pipe are optimized to yield the maximum length to diameter ratio. The maximum achievable length to diameter ratio is determined by the diffraction limit. We showed that as long as the pipe is diffraction limited the sensitivity of the sensor or minimum detectable volumetric flow rate dV/dT does not depend on the details of the interaction pipe dimensions. The high sensitivity of the flow sensor can be used for chemical, medical or biological applications.

In order to realize a flow meter described above, the light has to be taken out of the optical fiber and passed as an optical beam through the flowing material. Then this light has to be refocused back into the optical fiber. The alignment requirements to accomplish this are excessively delicate especially when the interaction region is long. We propose and demonstrate a new automatic alignment system capable of maintaining the maximum amount of light circulating in the system for a long time which makes the system practical.

PART II—SAGNAC INTERFEROMETER BASED FLOW PROBE

In this Part, we discuss the application of a Sagnac interferometer for measuring velocities of a moving medium. A moving medium "drags" the light propagating through it and the phrase velocity of the light depends on the direction of light propagation relative to the velocity of the material. This effect is called the Fresnel drag and represents the basic principle of the flow meter. The drag coefficient depends upon the refractive index of the material and is bigger for a more optically dense medium. Using a modifier Sagnac Interferometer we can arrange a system where the two counter-propagating light waves travel through a moving material obtaining a phase difference proportional to the velocity of the media. Because of the intrinsic reciprocity of a Sagnac interferometer, this phase shift is observed only in the presence of a flow, which makes it possible to realize an optical flow meter having an ultimately high sensitivity. We realized such a Sagnac interferometer based Fresnel drag fluid flow meter capable of detecting extremely small flow rates by using a near diffraction limited flow/light wave interaction pipe. An optimized design of the pipe along with the use of a state-of-the-art Sagnac interferometer results in a minimum detectable water flow rate of 1 drop per 5 hours. The flow meter's capability of measuring the water consumption by a small plant in real time has been demonstrated. We then designed an automated alignment system which finds and maintains the optimum fiber coupling regime, which makes the applications of the Fresnel drag based flow meters practical, especially if the length of the interaction pipe is big. Furthermore, we have applied the automatic alignment technique to an air flow meter, in order to guide the light through a long air flow/light interaction pipe, while automatically maintaining the optimum alignment. The use of the automatic alignment systems in the coherent domain reflectometry is believed to enhance the resolution of the reflectometry by increasing the length of the continuous scan.

A. FRESNEL DRAG FLUID FLOW SENSOR

(1) FRESNEL DRAG; AND (2) THEORY OF OPERATION

A new type of optical flow meter system based on measuring the Fresnel drag, using a Sagnac interferometer has recently been demonstrated [1] [2] [3]. The application of the Fresnel drag to measuring flow rates is based on the fact that the phase velocity of an optical beam going with the flow is speeded up by the factor $\alpha v$, while the phase velocity of the beam traveling against the flow is slowed down by the same amount where v is the velocity of the moving media and $\alpha$ is the drag coefficient given by $$\alpha = 1 - \frac{1}{\eta_2} - \frac{\lambda}{\eta} 0 \left[ \frac{dn}{d\lambda} \right] \lambda = \lambda_0 \quad (2.1)$$

Here n is the refractive index of the fluid and $\lambda 0$ is the free space wavelength of the light [4]. $\alpha=0.43$ for water. The phase shift induced by the Fresnel drag accumulated over an interaction length in non-reciprocal and therefore, can be measured very accurately using a Sagnac Interferometer. The phase difference accumulated by the counter-propagating light beams. $\alpha\phi$, is $$\Delta\phi = \left[ \frac{4\pi}{\lambda_0 c} n^2 \alpha L \right] c \equiv F_0 v \quad (2.2)$$

where L is the length of the optical path inside the flow, and c is the speed of light in vacuum. In general, this formula for the non-reciprocal phase shift experienced by the two counter-propagating light waves must be modified to account for the non-perfect overlap between the power density of the light beam and fluid velocity profile.

The volumetric flow rate, dV/dt, is related to the non-reciprocal phase shift by the expression:

$$\Delta\phi = \frac{16n^2\alpha L}{D^2\lambda_0 c}\left(\frac{F}{F_0}\right)\frac{dV}{dt} \quad (2.3)$$

where D is the diameter of the pipe. The factor $F/F_0$ plotted in reference [2] accounts for the overlap between the light and the fluid velocity profile.

Figure 1:
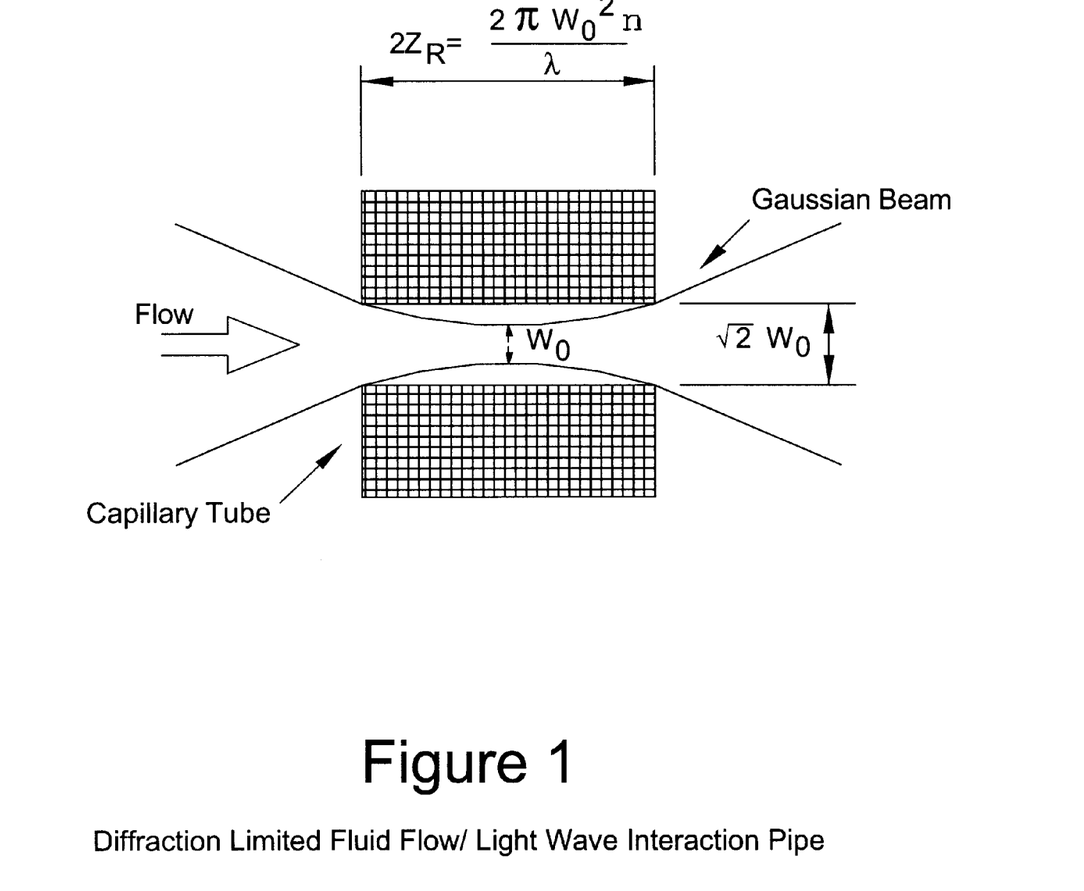
FIG. 1 is a graphic illustration of a diffraction limited fluid flow/light wave interaction pipe.

3. DIFFRACTION LIMITED FLOW-LIGHT WAVE INTERACTION pipe design For a given minimum detectable phase shift of the Sagnac interferometer, the maximum sensitivity in measuring a volumetric flow rate can be achieved if the dimensions of the pipe are optimized to yield the maximum L/D ratio. Consider a diffraction limited interaction pipe depicted in FIG. 1. The counter-propagating light waves that traverse the flow in the pipe are Gaussian beams. The Rayleigh range of a Gaussian beam, $2Z_R$, is proportional to the square of beam waist diameter $W_0$ as can be seen from equation 2.4

$$2Z_R = \frac{2\pi W_0^2 n}{\lambda} \quad (2.4)$$

The presence of the media slightly increases the effective Rayleigh length, since, due to the refractive index of the media being greater than 1, the wavelength of the light is shortened. A diffraction limited pipe has the length $L_{diff\ limited}$ equal to twice the Rayleigh length $Z_R$ and the diameter $D_{diff\ limited}$ equal to $\sqrt{2}W_0$. Substituting $L_{diff\ Limited}$ and $D_{diff\ limited}$ into equation 2.3 we find the non-reciprocal phase shift accumulated between the counter-propagating light waves in the diffraction limited interaction pipe, $\alpha\phi_{diff\ limited}$ to be given by $$\Delta\phi_{diff\ limited} = \frac{16n^3\alpha}{\lambda^2 c}\left(\frac{F}{F_0}\right)\frac{dV}{dt} \quad (2.5)$$

Figure 3:
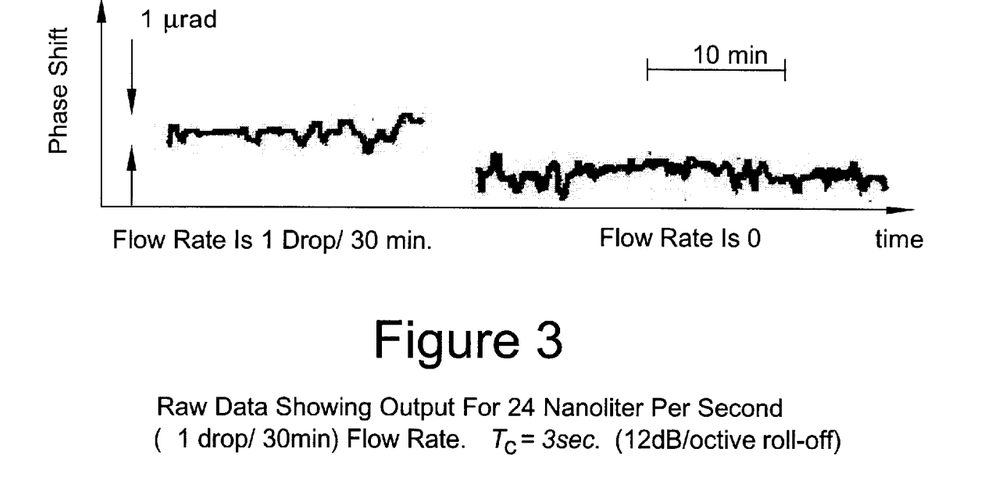
FIG. 3 is a graphic illustration of raw data showing output for 24 nanoliter per second (~1 drop/30 min) flow rate, $T_c=3$ sec. (12 dB/octave roll-off)

Since the light beam going through the diffraction limited pipe almost covers the flow inside the pipe, the quantity $$\frac{F}{F_0}$$

(taken from FIG. 3 of reference [2] can be put, with a good approximation to 1.15. From 2.5 we see that as long as we are diffraction limited the sensitivity of the sensor or minimum detectable volumetric flow rate dV/dT does not depend on the details of the interaction pipe dimensions. A long pipe with a large diameter results in the same sensitivity as a shorter pipe with a smaller diameter. As a numerical example, for water (n=1.33) and a wavelength of the source 0.8 µm the volumetric flow rate corresponding to a non-reciprocal phase shift of 0.1 µrad (a typical accuracy achieved in many fiber gyroscopes nowadays) is 0.33 nano liters per second (1 drop per 37 hours, taking the average water drop to have a volume of 43 µliters).

4. EXPERIMENT

Figure 2:
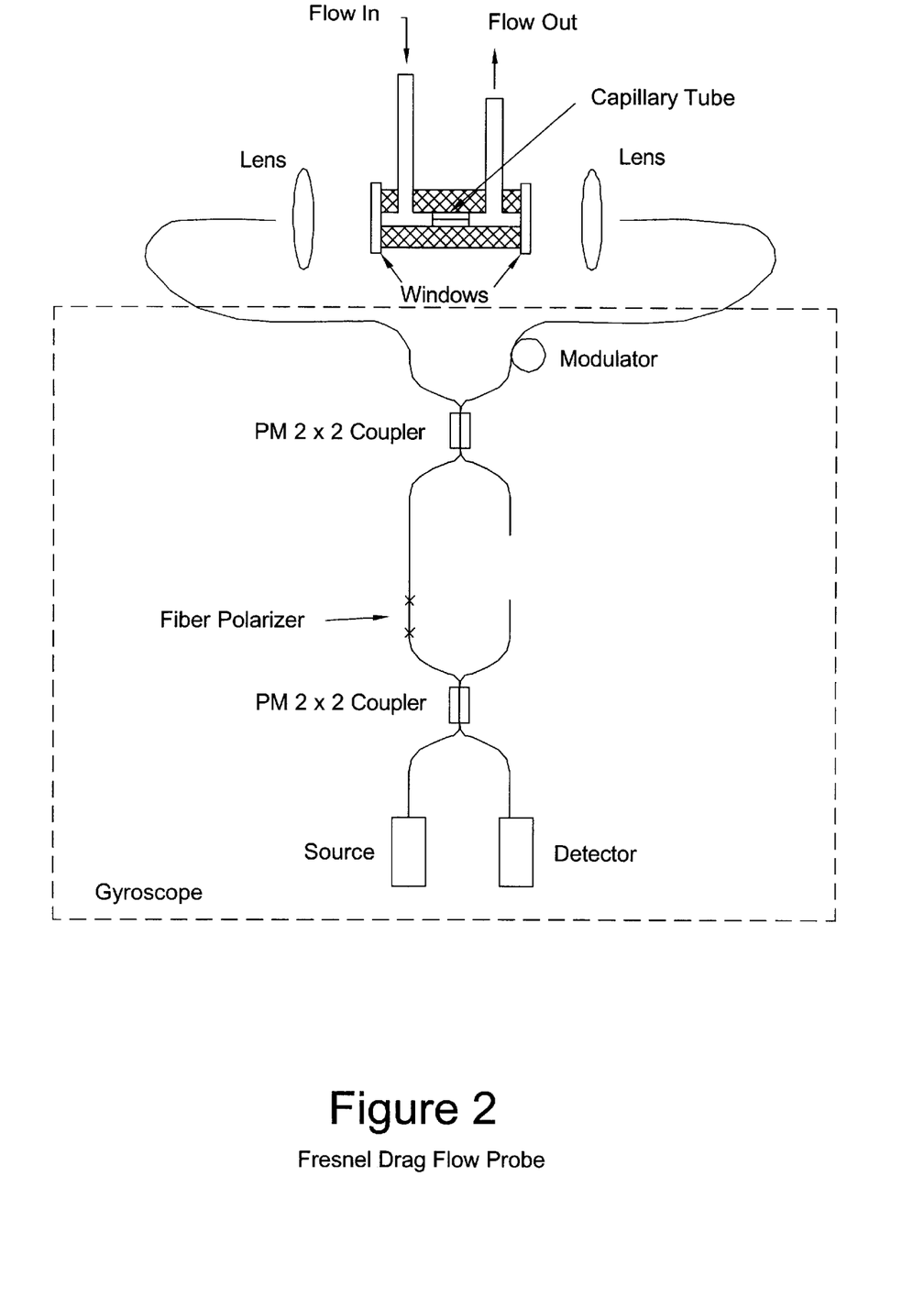
FIG. 2 is a graphic illustration of a Fresnel drag flow probe.

Measurement of ultra slow fluid flow rates. The experimental setup to test the ultra high sensitivity sensor is shown in FIG. 2. The Sagnac interferometer used in the experiment was a prototype of Honeywell's open-loop fiber gyroscope [5] product with a broken loop. The length of the fiber coil is 140 meters, the modulation frequency is 50 kHz and the operational wavelength of the light source is 0.8 µm. Its laboratory performance is 0.1 µrad long term drift and 1 µrad/√Hz short term noise. The interaction pipe was a capillary tube having a length, L=8 mm, and a diameter, D=91 µm. For this diameter the diffraction limited length $2Z_R$ is about 8.6 cm, or about 10 times longer than the actual pipe used in the experiment. Thus, our expected sensitivity is about an order of magnitude less than the optimum theoretically obtainable.

Figure 4:
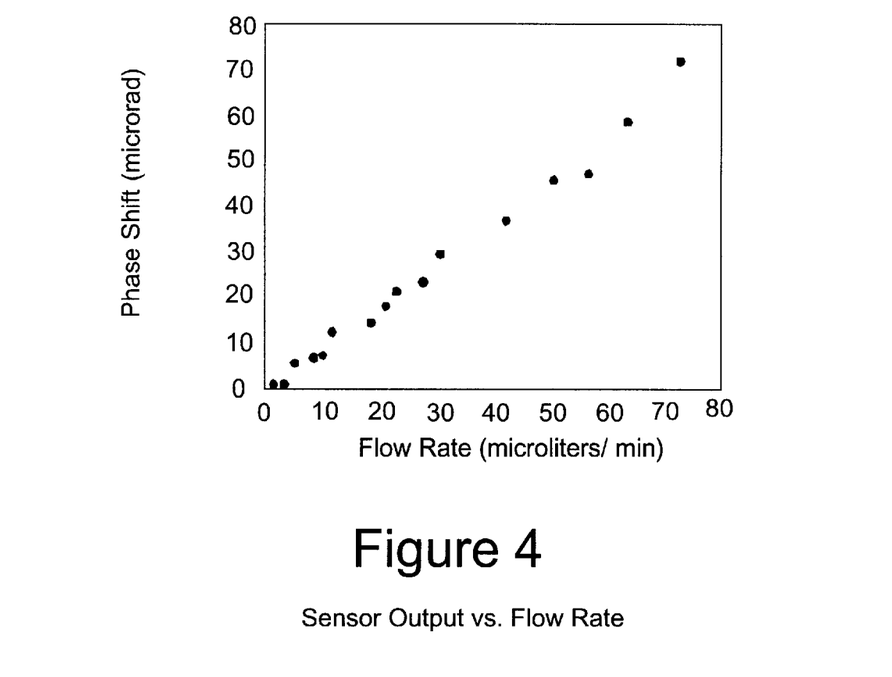
FIG. 4 is a flow chart of sensor output vs flow rate.

FIG. 3 presents raw data showing a non-reciprocal phase shift of 1 µrad for a flow rate of 24 nano liters per second (1 drop per 30 minutes). From this data, we ascertain the minimum obtainable flow rate to be 2.4 nano liters per second (1 drop per 5 hours). This surpasses the previous best sensitivity of 1 drop per minute [2] by a factor of 300. To calibrate the sensor we measured the volume of the outcoming water by counting the drops and assuming each drop carries our measured value of 43 µliters of water. The uncertainty in the measurements due to the evaporation of the water collected in a drop was investigated and found to be negligible. FIG. 4 presents a plot of sensor output vs flow rate.

5. EXPERIMENT

Figure 5:
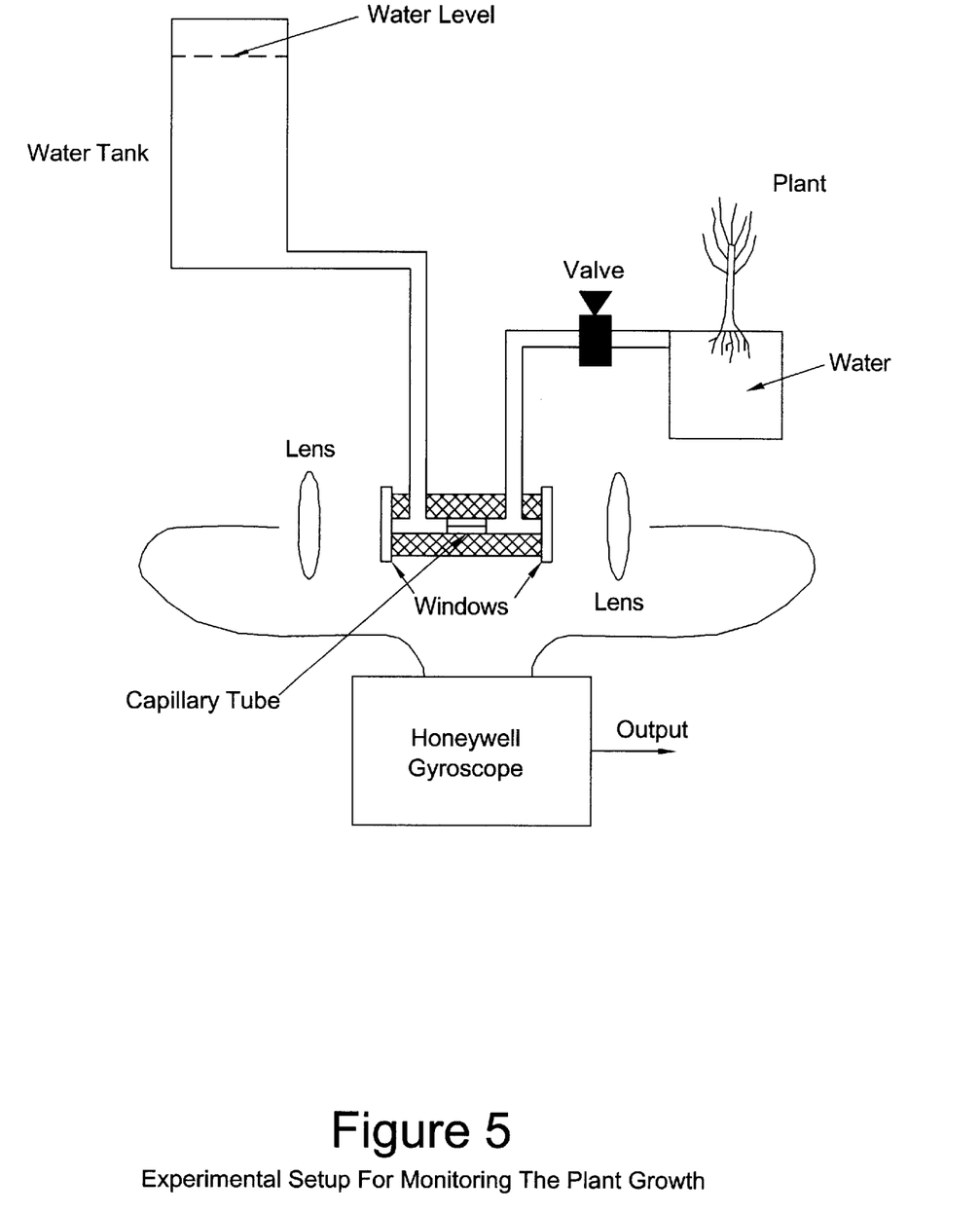
FIG. 5 is a graphic illustration of an experimental setup for monitoring the plant growth.
Figure 6:
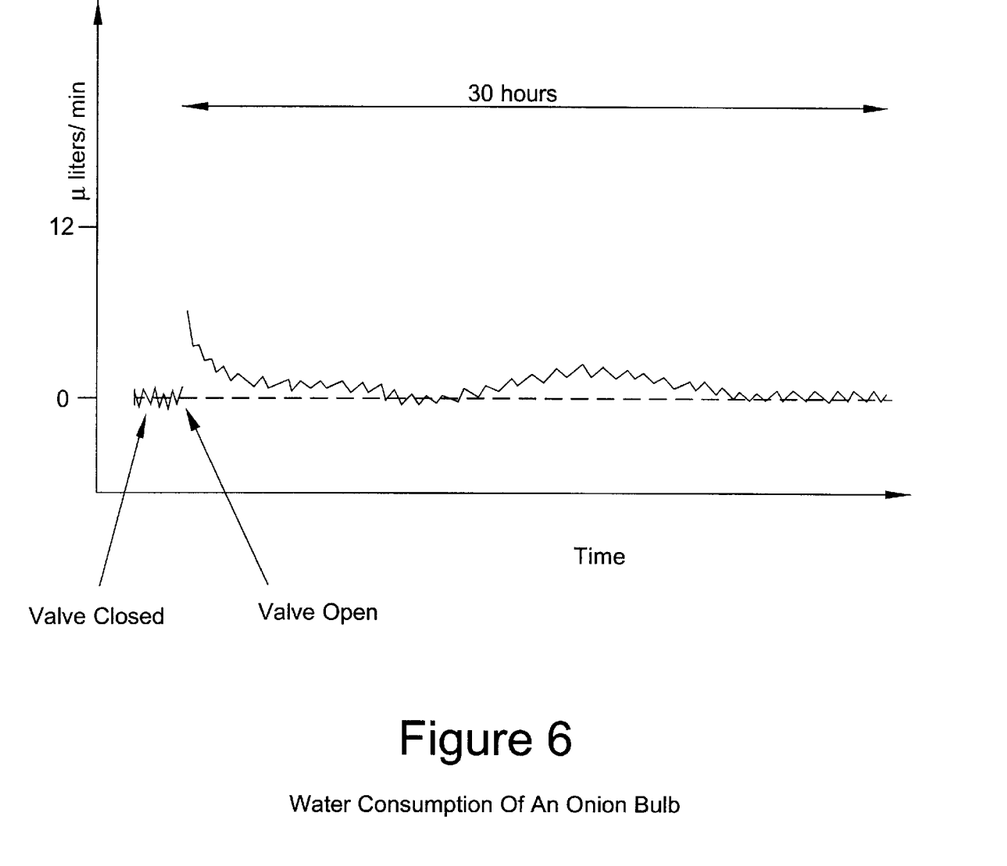
FIG. 6 is a graphic illustration of water consumption of an onion bulb.

The consumption of water by a small plant. The high sensitivity of the flow sensor can be used for monitoring in real time the amount of water or other chemical a plant consumes. FIG. 5 shows an experiment we conducted demonstrating the feasibility of such an application. The roots of an onion bulb were placed into water and sealed off to prevent leakage. The water tank was elevated above the plant to provide a pressure drop. In this case the only way the water can escape from the container is through the plant. As the plant drinks it removes some water from the container in which it is sitting which makes the water move from the tank down to the container. On the way down the water passes the Fresnel drag flow optical interaction region where the volumetric flow rate is determined. We used the flow meter described above to monitor the consumption of water by the onion during the day. FIG. 6 presents the raw data from the output of the flow sensor. At the start, the flow valve was closed and for some time, the onion was unable to draw water through the system. Once the valve was opened, the onion consumed a relatively large amount of water at an exponentially decaying rate for the first few hours. We continued to monitor the onion's water consumption for several days. During this initial pre-leaf stage of the onion's development we were unable to verify any systematic day/night water consumption patters. The total amount of water the onion consumed for the 30 hours test shown was 2.5 m liters and it varied during the day.

B. AUTOMATIC ALIGNMENT SYSTEM FOR FLOW METERING APPLICATIONS

1. PRINCIPLE OF OPERATION

Figure 7:
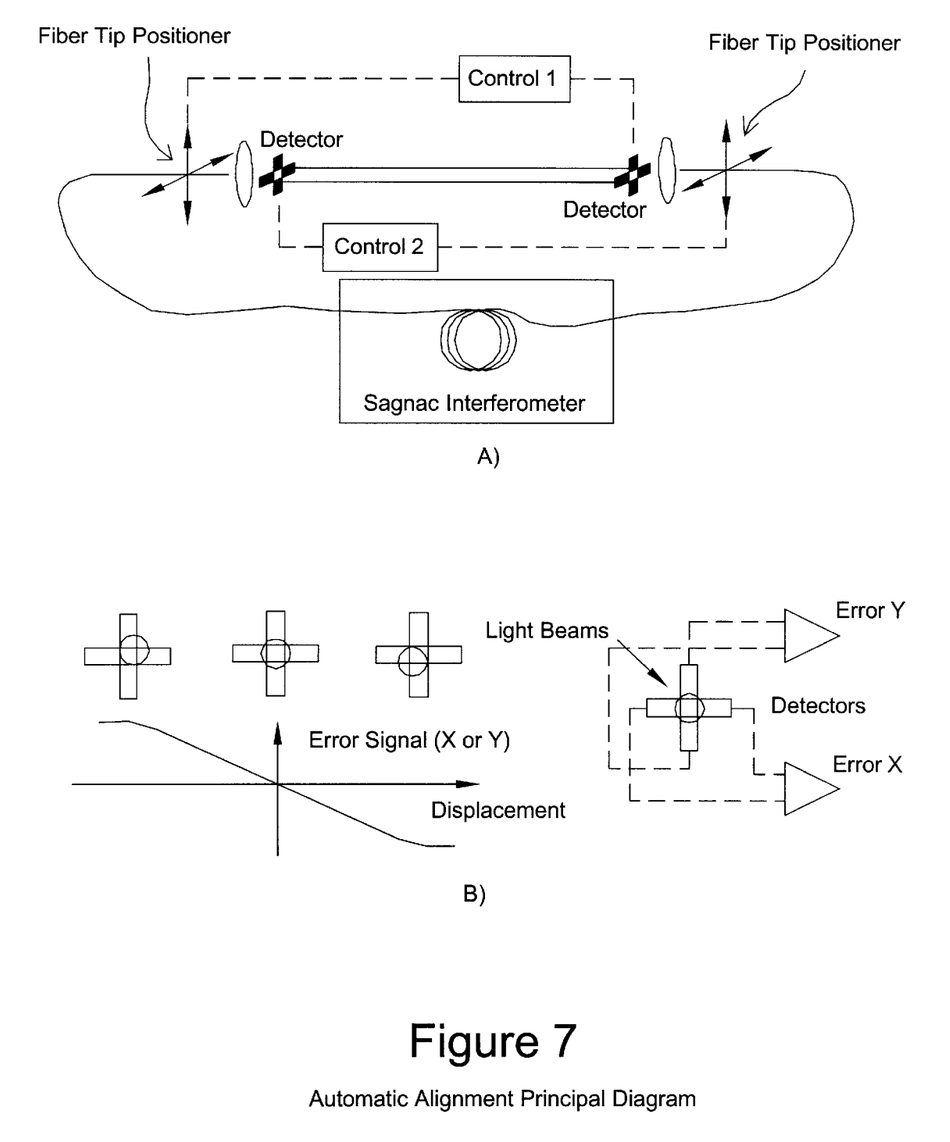
FIG. 7 is a diagram illustrating an automatic alignment principle.

In order to realize a flow meter described above, the light has to be taken out of the optical fiber and passed as an optical beam through the flowing material. Then this light has to be refocused back into the optical fiber. The alignment requirements to accomplish this are excessively delicate, especially when the interaction region is long. In order for the system to become practical, a method for guiding the light beams through the flow and back into the optical fibers is necessary. FIG. 7 shows our alignment scheme. Light travels both ways through the flow. Because of reciprocity, when the system is well aligned, the light beams traveling in the two directions overlap in space. To ensure that the counter propagating waves overlap in space, it is sufficient to ensure that they overlap at two distinct points. (Two points determine a line). This overlap can be accomplished by aperturing the light waves at two points along the path (we do it at the lenses), placing photodetectors on the apertures, and then controlling the positions of the fiber tips using PZT actuators to center the optical beams within the apertures. Our realization of the photodetector arrangement for detecting the position of the light beam is shown in FIG. 7. If an equal amount of light falls onto the two photodetectors placed along the Y or X axis, the error signal controlling the position of the fiber in the corresponding plane is zero. FIG. 7 also shows the relative position of the light beam and the photodetectors as well as the corresponding error signal versus the displacement in the X and Y directions in the case where the feedback loop is open. In order to properly calculate the parameters of the servo system we need to know both the amplitude and the frequency transfer function of the servo element. In our case the servo element is a PZT driven stage with the fiber attached to it. In order to calculate the amplitude transfer functions, consider the arrangement of the optical elements depicted in FIG. 8.

Figure 8:
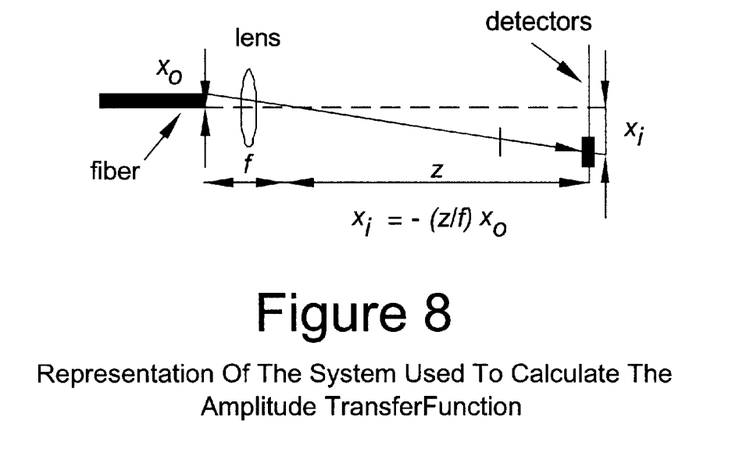
FIG. 8 is a diagram illustrating the representation of the system used to calculate the amplitude transfer function.

We would like to compute how much the spot on the detectors moves if the fiber tip positioned in the focal plane of the opposite lens is translated a distance $x_0$ $y_0$ In FIG. 8 f is the focal length of the lens and z is the distance to the position sensitive detectors. At the output of the fiber the field can be described by $$E(x^0, y^0) = e^{a((x^0-x_0)^2 + (y^0-y_0)^2)} \tag{2.6}$$

Where the upper index denote the coordinates x and y in the plane of the object and the lower index is the constant translation in the plane of the object. Using the Fourier optic analysis [6] we can find the spacial distribution of the field as it propagates through space. In the far field the spacial distribution of the field is just the Fourier transform of the distribution in the near field. The calculations are simplified by the fact that the Fourier transform of the Gaussian beam is still a Gaussian beam, the only integral we need to use to calculate it is the Poisson integral. The details of the calculations are presented in Appendix A. The coordinates of the beam spot in the image plane (on the position sensitive detectors) have found to be:

$$x_1, y_1 = -\frac{z}{f} x_0, y_0 \tag{2.7}$$

It follows from this equation that if we change the distance between the fiber tips while maintaining the alignment at the same time, the gain will vary which may lead to the instability of the servo lock. In order to prevent that, an automatic gain control circuit needs to be designed. This is particularly important for the applications of the alignment system used for the coherent domain reflectometry, where in order to achieve a high resolution, the distance from the fiber tip to the detector set is to be changed significantly. This system will be described later in the Part. The position of the fiber on the left is controlled by the detectors on the aperture on the right, while the position of the fiber on the right is controlled by the detectors on the aperture on the left. To maintain the alignment in the Z direction the total intensity on all the detectors is to be kept constant. This, on the other hand, leads to a lossy system, because some amount of light has to be cut by the photo diode aperture at the front of the lens, so that the servo system obtains the error signal and locks the position of the fiber tops to maintain constant intensity on the detectors. For a given light/media interaction length, we can optimize the optical components, the PZT actuators and the loop electronics to achieve minimum optical losses and robust performance of the servo. Servo bandwidths of more than 10 kHz are readily achievable.

We note that there is an interesting derivative of this alignment system which can have applications outside Sagnac interferometer systems as shown in FIGS. 9 and 10. In systems such as coherence domain reflectometers, it is necessary to have light exit an optical fiber, propagate to a mirror, reflect back to the fiber and then re-enter the fiber. As in the system described above, the alignment will be good when the reflected light overlaps the outgoing light. This can be accomplished by positioning the fiber tip such that the outgoing light overlaps the incoming light at one point in the z-axis. The second overlap point is guaranteed to exist at the mirror. Thus, one aperture and detector set which measures the spatial position of the incoming light beam placed near the fiber tip is used to control the position of the fiber tip as shown in FIG. 10.

2. AIR FLOW MEASUREMENTS

Figure 12:
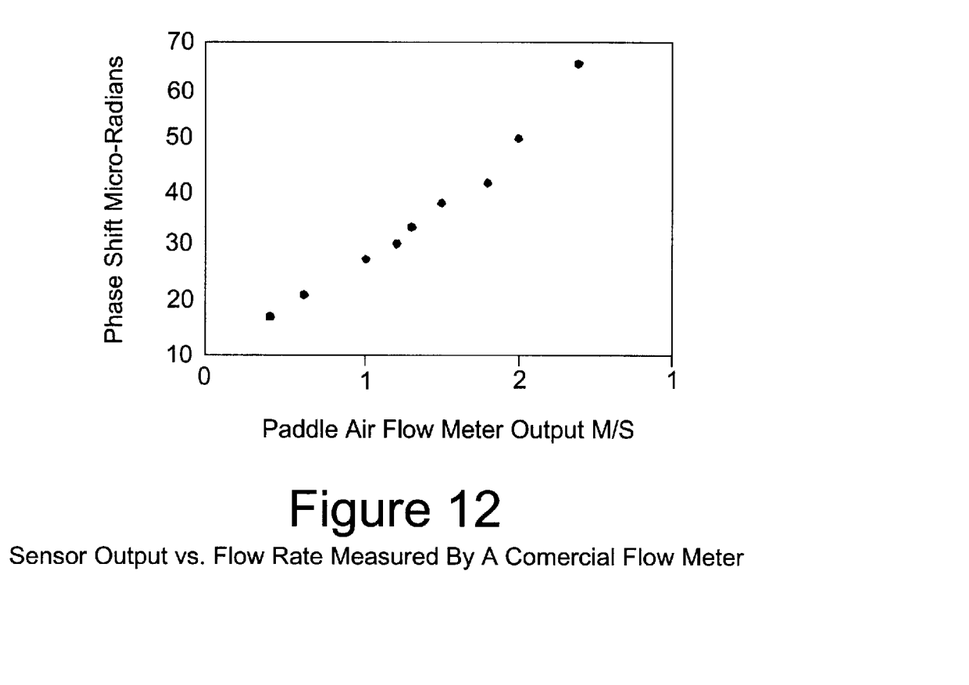
FIG. 12 is a graphic illustration sensor output vs flow rate measured by a commercial flow meter.

To demonstrate the capability of the automatic alignment, we set up an air flow interferometer, shown in FIG. 11. The same Honeywell gyroscope as described above was used for the experiment. Breaking the loop in the middle alleviates the errors caused by time dependent changes in the flow rate as both optical beams pass the flow at the same time. The light was taken out of the fiber, guided through a 2 meter long pipe, and automatically refocused on the fiber tips. A small fan was attached to one end of the pipe to produce an air flow in the range of 0–5 m/s. Since the refractive index of the air is different from 1, the Sagnac interferometer is sensitive to the flow. The flow rate measured by the Sagnac interferometer was calibrated using a commercially available paddle-type flow meter "OMEGA" HH-F10. FIG. 12 shows the phase shift measured by the Sagnac interferometer against the read out of the conventional flow meter. The Sagnac interferometer was able to measure far smaller flow rates than this conventional flow meter. We project the minimum detectable air flow rate for our experimental setup, assuming the Sagnac interferometer has 0.1 $\mu$rad stability, to be 2.5 mm/second, which is far less than the 0.4 m/s for the conventional flow meter.

Figure 13:
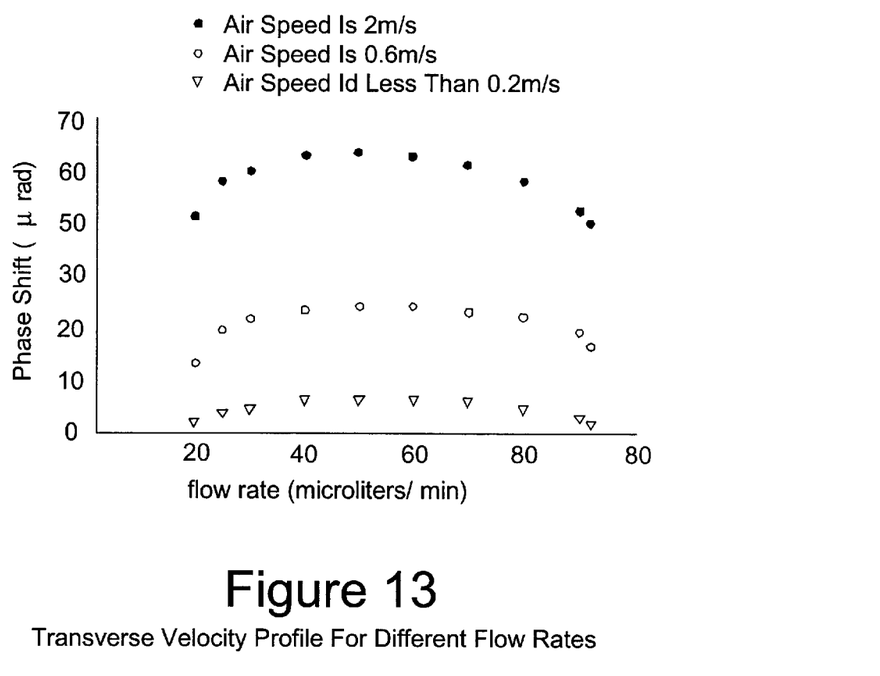
FIG. 13 is a graphic illustration transverse velocity profile for different flow rates.

The Sagnac interferometer flow meter has an advantage that it is a non-intrusive device and can be used to measure longitudinal velocity profiles in the systems where other flow meters fail to operate adequately. FIG. 13 shows the transverse velocity profiles taken for several flow rates. As expected, the velocity near the wall of the pipe becomes lower due to the air friction effect.

C. CONCLUSIONS

We have demonstrated an improved sensitivity Sagnac Interferometer based flow meter using a diffraction limited interaction pipe. We obtained a minimum detectable flow rate of 2.4 nanoliter per second (1 drop of water per 5 hours). Furthermore, we showed that this flow probe has enough sensitivity to measure the process of water consumption of a plant in real time. Finally, we have designed an automated alignment system for guiding the light through the media without losing the alignment and demonstrated its capability in a Sagnac interferometer based gas flow meter.

REFERENCES

[1] R. deCarvalho J. Blake. W. Sorin. "A Fresnel drag flow meter" in *Proceedings of the 9th Optical Fiber Sensors Conference*, (Optical Society of America, Washington D.C.); pp. 397–400, 1993.
[2] R. deCarvalho and J. Blake. "Slow-flow measurements and fluid dynamics analysis using the Fresnel drag effect". *Appl. Opt.*, vol. 33. pp. 6073–6077, 1994.
[3] A. Tselikov and J. Blake. "Fresnel drag measurements for determination of ultra slow flow rates" in Proceedings of the 12th International Conference on Optical Fiber Sensors. OSA Technical Digest Series (Optical Society of America, Washington D.C.), vol. 16, pp. 206–209, 1997.
[4] G. A. Sanders and S. Ezekeil. "Measurements of Fresnel drag in moving media using a ring resonator". *Journal of Optical Society of America B*. vol. 5. pp. 674–678, 1988.
[5] J. Blake, B. Szafraniec, J. Feth, and K. Dimond. "Progress in low-cost interferometric fiber optic gyros" in *Sensors and Senor Systems for Guidance and Navigation*, II S. S. Welch ed., Proc Soc. *Photo-Opt. Instrum. Eng.*, vol. 1694, pp. 188–192, 1992.
[6] Joseph Goodman. *Fourier Optics*, New York: A Wiley-Interscience Publication. 1988.

APPENDIX A

We start with the equation describing the Gaussian distribution of the fiber mode in the plane of the fiber facet.

$$E(r\ o\cdot y^o) = ea[(x^o - to)2 + (y^o - yo)2] \quad (A.1)$$

Before we apply the Fourier optics rules to calculate the field distributions at different distances z. as the light propagates, let us first check if we can apply the far field assumption, to our system. The field distribution $E_{lens}$ in the plane of the lens can be considered the far field if the distance from the fiber to the lens is greater than $$= FarField > \frac{nd2}{\lambda} \quad (A.2)$$

where $\lambda$ is the wavelength, and d is the diameter of the fiber core. For typical values used in practice, $\lambda = 0.8$ $\mu$m and d=10 $\mu$m. this distance is equal to 0.4 mmm. which is much smaller that the local length of the lens f~5 mm. Therefore the distance from the fiber tip to the lens can be considered as the far field and the field distribution on the lens is the Fourier transform of the field described by equation. A1. The upper index denotes a variable coordinate and the lower index describes the constant translation.

$$E_{lens} = F[E(x^o \cdot y^o)] = \int\int E\big((x^o \cdot y^o)e_{j2\pi [\frac{x1}{\lambda z}x^o + \frac{y1}{\lambda z}y^o]}\big) dx^o dy^o \quad (A.3)$$

On the lens, $\approx = f$ and after taking the integral, the field distribution on the lens can be written as follows:

$$E_{lens} = \frac{1}{a\pi} e \frac{\pi 2}{x2f2a}(x1)2 + (y1)2e - j\frac{2\pi}{xf}(xlxo = ylyo) \quad (A.4)$$

The lens changes the distribution of the field in the following way:

$$E_{afterlens} - E_{lens} e - j\pi(x1)2 + \frac{(y1)2}{xf} - j\phi \quad (A.5)$$

where $\phi$ is a phase shift, which we can ignore. The field distribution at a distance z away from the lens is found by Fourier transforming the field distribution $E_{afterlens}$.

$$E_{x1y1} = \int\int e - \quad (A.6)$$
$$j\frac{2\pi}{xf}\Big(xlxo + ylyo + \frac{(x1) - (y1)2}{2}e - \frac{\pi 2((x1)2 + (y1)2)}{x2f2n}e -$$
$$j2\pi\Big(\frac{xlxi}{\lambda \approx} + \frac{ylyi}{\lambda \approx}\Big)dx1dy1$$

where $E(x^i \cdot y^i)$ is the field distribution in the plane of detectors. After taking the integral we finally obtain:

$$E(x2 \cdot y1) \sim e\frac{n2bf}{\lambda 2z}(x1 + (z/f)xo)\frac{1}{32 + (n/\lambda)2} \quad (A.7)$$
$$e\frac{\pi 2of}{\lambda 2 \approx}(y1 + (z/f)yo)\frac{1}{32 + (\pi/x)2}$$

We note, that the distribution of the field in the pane of the detectors is also Gaussian, but the center of the spot is shifted by $(-x^o \cdot y^o)$. The expression connecting the coordinates of the beam in the plane of the fiber to the coordinates of the beam in the plane of the position sensitive detectors can be written as follows:

$$y_i = -\frac{\approx}{f}x_o \cdot y_o \quad (A.8)$$

While the present invention has been particularly shown and described with reference to the accompanying figures, it will be understood, however, that other modifications thereto are of course possible, all of which are intended to be within the true spirit and scope of the present invention. It should be appreciated that components of the invention aforedescribed may be substituted for other suitable components for achieving desired similar results.

More particularly, the present invention is applicable to wide array of mediums from air flow to water, gasseous mediums to liquid chemicals, among others, as well as a wide array of bulk optical materials.

Lastly, control systems and actuators, such as PZT stack actuators, and other types as well, are widely known in order to achieve the intended function of proper positioning of the optical components as described herein, all of which are intended to be within the true spirit and scope of the present invention.

We claim:

1. An optical flow sensor for providing a measurement of flow of a medium where the transit time of an optical beam passing through the medium is affected by the flow of the medium, the optical flow sensor comprising:
   means for generating first and second optical beams;
   an automated optical alignment system for
      (i) directing said first and second optical beams in opposite directions along a selected optical path through said medium at least in part, and
      (ii) automatically aligning the first and second optical beams relative to each other such that said first and second optical beams are substantially spatially overlapped at first and second distinct optical points occurring along said selected optical path, where the automated optical alignment system includes, a first detector for generating a first error signal indicative of the degree that said first and second optical beams are spatially overlapped at said first distinct optical point, a second detector for generating a second error signal indicative of the degree that said first and second optical beams are spatially overlapped at said second distinct optical point, and control mean responsive to the first and second error signals for directing said automated optical alignment system to drive said first and second error signals toward a value indicative of said first and second optical beams being substantially overlapped at said first and second optical points; and measurement means responsive to said first and second optical beams exiting said medium for providing an indication of the differential propagation time between said first and second optical beams propagating between first and second spatial regions of said medium, where said differential propagation time is indicative of flow of said medium.

2. The optical flow sensor of claim 1 wherein said measurement means comprises a sagnac interferometer.

3. The optical flow sensor of claim 2 wherein said first and second optical beams counter-propagate through a common optical path including said selected optical path through said medium.

4. The optical flow sensor of claim 1 wherein:

said measurement means is a sagnac interferometer including, first and second collimating lenses;

a fiber optic loop having first and second optical fiber end segments each having a terminating end for passing light into and therefrom, and where said terminating ends of said first and second optical fiber end segments and said first and second lenses are arranged such that, (i) a first optical beam emanating from said terminating end of said first optical fiber end segment passes through said first collimating lens so as to direct said first optical beam to enter said medium at a first spatial region thereof, propagate through said medium, exit from a second spatial region of said medium, pass through said second collimating lens, and enter said terminating end of said second optical fiber end segment, and (ii) a second optical beam emanating from said terminating end of said second optical fiber end segment passes through said second collimating lens so as to direct said second optical beam to enter said medium at a second spatial region thereof, propagate through said medium, exit from said first spatial region of said medium, pass through said first collimating lens, and enter said terminating end of said first optical fiber end segment; and said automated optical alignment system includes, a first optical aperture means interposed between said first collimating lens and said first spatial region of said medium for passing substantially said first optical beam only through a first selected aperture region, a second optical aperture means interposed between said second collimating lens and said second spatial region of said medium for passing substantially said second optical beam only through a second selected aperture region, at least one photodetector coupled to said second aperture means and in proximity to said second selected aperture region for providing said first error signal indicative of any portion of said first optical beam emanating from said second spatial region of said medium, directed toward said second aperture means, and impinging upon said at least one photodetector coupled to said second aperture, at least one photodetector coupled to said first aperture means and in proximity to said first selected aperture region for providing said second error signal indicative of any portion of said second optical beam emanating from first spatial region of said medium, directed toward said first aperture means, and impinging upon said at least one photodetector coupled to said first aperture, and said control means is responsive to said first and second error signals for selectively positioning each terminating end of said first and second optical fiber segments, and said first and second lenses, such that said first and second optical beams are substantially spatially overlapped along said selected optical path through said medium.

5. The optical flow sensor of claim 4 wherein said first and second collimating lenses on either side of the flowing medium comprise GRIN lenses.

6. The optical flow sensor of claim 4 wherein said control means includes means for positioning each terminating end of said first and second optical fiber end segments relative to said first and second lenses, respectively, such that said first and second optical beams substantially spatially overlap through said medium along said selected optical path.

7. The optical flow sensor of claim 4 wherein each terminating end of said first and second optical fiber end segments is coupled to first and second actuators, respectively, for positioning each terminating end so as to cause said first and second optical beams to be substantially spatially overlapped along said selected optical path through said medium.

8. An optical sensor for providing an indication of non-reciprocal phase shift imparted upon a pair of counter-propagating optical beams passing through a medium comprising:

means for generating first and second optical beams;

an automated optical alignment system for, (i) directing said first and second optical beams in opposite directions along a selected optical path through said medium at least in part, and (ii) automatically aligning the first and second optical beams relative to each other such that said first and second optical beams are substantially spatially overlapped at first and second distinct optical points occurring along said selected optical path, where the automated optical alignment system includes, a first detector for generating a first error signal indicative of the degree that said first and second optical beams are spatially overlapped at said first distinct optical point, a second detector for generating a second error signal indicative of the degree that said first and second optical beams are spatially overlapped at said second distinct optical point, and control mean responsive to the first and second error signals for directing said automated optical alignment system to drive said first and second error signals toward a value indicative of said first and second optical beams being substantially overlapped at said first and second optical points; and measurement means responsive to said first and second optical beams exiting said medium for providing an indication of the non-reciprocal phase shift between said first and second optical beams propagating between first and second spatial regions of said medium, where said non-reciprocal phase shift is indicative of flow of said medium.

9. The optical sensor of claim 8 wherein said measurement means comprises a sagnac interferometer.

10. The optical sensor of claim 8 wherein said first and second optical beams counter-propagate through a common optical path including said selected optical path through said medium.

11. The optical sensor of claim 8 wherein:
said measurement means is a sagnac interferometer including:
   first and second collimating lenses;
   a fiber optic loop having first and second optical fiber end segments each having a terminating end for passing light into and therefrom, and where said terminating ends of said first and second optical fiber segments and said first and second lenses are arranged such that,
      (i) a first optical beam emanating from said terminating end of said first optical fiber end segment passes through said first collimating lens so as to direct said first optical beam to enter said medium at a first spatial region thereof, propagate through said medium, exit from a second spatial region of said medium, pass through said second collimating lens, and enter said terminating end of said second optical fiber end segment, and
      (ii) a second optical beam emanating from said terminating end of said second optical fiber end segment passes through said second collimating lens so as to direct said second optical beam to enter said medium at a second spatial region thereof, propagate through said medium, exit from said first spatial region of said medium, pass through said first collimating lens, and enter said terminating end of said first optical fiber end segment; and
said alignment means includes,
   a first optical aperture means interposed between said first collimating lens and said first spatial region of said medium for passing substantially said first optical beam only through a first selected aperture region;
   a second optical aperture means interposed between said second collimating lens and said second spatial region of said medium for passing substantially said second optical beam only through a second selected aperture region;
   at least one photodetector coupled to said second aperture means and in proximity to said second selected aperture region for providing said first error signal indicative of any portion of said first optical beam emanating from said second spatial region of said medium, directed toward said second aperture means, and impinging upon said at least one photodetector coupled to said second aperture means;
   at least one photodetector coupled to said first aperture means and in proximity to said first selected aperture region for providing said second error signal indicative of a selected portion of said second optical beam emanating from first spatial region of said medium, directed toward said first aperture means, and impinging upon said at least one photodetector coupled to said first aperture means; and
said control means is responsive to said first and second error signals for selectively positioning each terminating end of said first and second optical fiber end segments, and said first and second lenses, such that said first and second optical beams are substantially spatially overlapped along said selected optical path through said medium.

12. A fiber optic alignment system for automatically aligning counter-propagating first and second optical beams to propagate through a medium along substantially the same optical path such that the first and second optical beams are substantially spatially overlapped at first and second distinct optical points, said fiber optic alignment system comprising:
   first and second collimating lenses;
   first and second optical fiber segments each having a terminating end for passing light into and therefrom, and where said terminating ends of said first and second optical fiber segments and said first and second lenses are arranged such that,
      (i) a first optical beam emanating from said terminating end of said first optical fiber segment passes through said first collimating lens so as to direct said first optical beam to enter said medium at a first spatial region thereof, propagate through said medium, exit from a second spatial region of said medium, pass through said second collimating lens, and enter said terminating end of said second optical fiber segment;
      (ii) a second optical beam emanating from said terminating end of said second optical fiber segment passes through said second collimating lens so as to direct said second optical beam to enter said medium at said second spatial region thereof, propagate through said medium, exit from said first spatial region of said medium, pass through said first collimating lens, and enter said terminating end of said first optical fiber segment;
   a first optical aperture means interposed between said first collimating lens and said first spatial region of said medium for passing substantially said first optical beam only through a first selected aperture region;
   a second optical aperture means interposed between said second collimating lens and said second spatial region of said medium for passing substantially said second optical beam only through a second selected aperture region;
   at least one photodetector coupled to said second aperture means and in proximity to said second selected aperture region for providing a first output signal indicative of any portion of said first optical beam emanating from said second spatial region of said medium, directed toward said second aperture means, and impinging upon said at least one photodetector coupled to said second aperture means;
   at least one photodetector coupled to said first aperture means and in proximity to said first selected aperture region for providing a second output signal indicative of any portion of said second optical beam emanating from first spatial region of said medium, directed toward said first aperture means, and impinging upon said at least one photodetector coupled to said first aperture means; and control means responsive to said first and second output signals for selectively positioning each terminating end of said first and second optical fiber segments, and said first and second lenses, such that said first and second optical beams are substantially spatially overlapped at first and second optical points along a selected optical path.

13. The fiber optic alignment system of claim 12 wherein said first and second collimating lenses on either side of the flowing medium comprise GRIN lenses.

14. The fiber optic alignment system of claim 12 wherein said control means includes means for positioning each terminating end of said first and second optical fiber segments relative to said first and second lenses, respectively, such that said first and optical beams spatially overlap through said medium along said selected optical path.

15. The fiber optic alignment system of claim 12 wherein each terminating end of said first and second optical fiber segments is coupled to first and second positioning actuators, respectively, having at least two-degrees of freedom.

16. The fiber optic alignment system of claim 12 wherein each terminating end of said first and second optical fiber segments is coupled to first and second positioning actuators, respectively, where said first actuator is responsive to at least said second output signal, said second actuator is responsive to at least said first output signal.

17. A bulk optic optical delay line comprising:
an optical fiber segment having a first terminating end;
a collimating lens interposed between said terminating end of said optical fiber segment and a first spatial region of a bulk optic medium;
means for directing a transmitted optical beam emanating from said terminating end of said optical fiber segment through said collimating lens, and to impinge upon the first spatial region of the bulk optic medium, propagate along an optical path through the bulk optic medium, and exit a second spatial region of said bulk optic medium;
mirror means for deriving a reflected optical beam from said first optical beam exiting said second spatial region, and directing said reflected optical beam to impinge upon said second spatial region, propagate along said optical path through the bulk optic medium, exit said first spatial region of said bulk optic medium, and impinge upon said terminating end of said optical fiber segment;
an optical aperture means interposed between said collimating lens and said first spatial region of said bulk optic medium for passing substantially said transmitted and reflected optical beams only through a selected aperture region thereof;
at least one photodetector coupled to said first aperture means for providing a first output signal indicative of any portion of said reflected optical beam emanating from said first spatial region of said bulk optic medium, directed toward said optical aperture means, and in a spatial region excluding and away from said selected aperture region; and
control means responsive to said first output signal for selectively positioning said terminating end of said optical fiber segment and said collimating lens, such that said transmitted and reflected optical beams are substantially spatially overlapped as said transmitted and reflected optical beams propagate through said medium.

18. The bulk optic optical delay line of claim 17 wherein said control means includes an actuator coupled to said terminating end of said optical fiber segment for positioning said terminating end thereof relative to said lens.

19. The bulk optic optical delay line of claim 16 wherein said collimating lenses comprises GRIN lenses.

20. The bulk optic optical delay line of claim 17 wherein the terminating end of said optical fiber segment is coupled to an actuator for positioning said terminating end so as to cause said transmitted and reflected optical beams to be substantially spatially overlapped as said transmitted and reflected optical beams propagate through said medium.

21. The fiber optic alignment system of claim 12 further comprising:
one or more additional photodetectors coupled to said second aperture means and surrounding a central axis passing through said second selected aperture region, each providing an output signal indicative of any portion of said first optical beam emanating from said second spatial region of said medium, directed toward said second aperture means and impinging upon said photodetectors;
one or more additional photodetectors coupled to said first aperture means and surrounding a central axis passing through said first selected aperture region, each providing an output signal indicative of any portion of said second optical beam emanating from first spatial region of said medium, directed toward said first aperture means and impinging upon said photodetectors; and
said control means is responsive to,
said output signals from said photodetectors coupled to said second aperture means for selectively positioning said terminating end of said first fiber optic segment and said first lens in two degrees of positional freedom relative to said central axis passing through said first aperture region, and
said output signals from said photodetectors coupled to said first aperture means for selectively positioning said terminating end of said second fiber optic segment and said second lens in two degrees of positional freedom relative to said central axis passing through said second aperture region.

22. The optical flow senor of claim 4 further comprising:
one or more additional photodetectors coupled to said second aperture means and surrounding a central axis passing through said second selected aperture region, each providing an output signal indicative of any portion of said first optical beam emanating from said second spatial region of said medium, directed toward said second aperture means and impinging upon said photodetectors;
one or more additional photodetectors coupled to said first aperture means and surrounding a central axis passing through said first selected aperture region, each providing an output signal indicative of any portion of said second optical beam emanating from first spatial region of said medium, directed toward said first aperture means and impinging upon said photodetectors associated with said first aperture means; and
said control means is responsive to,
said output signals from said photodetectors coupled to said second aperture means for selectively positioning said terminating end of said first fiber optic segment and said first lens with at least two degrees of positional freedom relative to said first aperture region, and said output signals from said photodetectors coupled to said first aperture means for selectively positioning said terminating end of said second fiber optic segment and said second lens with at least two degrees of positional freedom relative to said second aperture region.

23. The bulk optic optical delay line of claim 17 wherein said bulk optic medium is air.

24. A method for providing a measurement of flow of a medium comprising the steps of:

generating first and second optical beams;

directing said first and second optical beams in opposite directions along a selected optical path through said medium, where said selected optical path is such that the transit time of said optical beams is affected by the flow of the medium, including the steps of,
   (i) directing said first optical beam through a first optical alignment system such said first optical beam is directed to pass through a first spatial region of said medium and exit a second spatial region of said medium, and
   (ii) directing said second optical beam through a second optical alignment system such that said second optical beam is directed to pass through the second spatial region of said medium and exit the first spatial region of said medium;

automatically aligning said first and second optical alignment systems, in response to first and second command signals, respectively, for aligning said first and second optical beams relative to each other such that said first and second optical beams are substantially spatially overlapped at first and second distinct optical points occurring along said selected optical path, wherein the step of automatically aligning said first and second optical beams includes the steps of,
   (i) detecting any portion of said first optical beam exiting said second spatial region of said medium and impinges upon a first detector, and generating a first error signal indicative thereof, where said first error signal is indicative of the degree that said first and second optical beams are spatially overlapped at said first distinct optical point,
   (ii) detecting any portion of said second optical beam exiting said first spatial region of said medium and impinges upon a second detector, and generating a second error signal indicative thereof, where said second error signal is indicative of the degree that said first and second optical beams are spatially overlapped at said second distinct optical point, and
   (iii) generating said first and second command signals in response to said first and second error signals for controlling said first and second optical alignment systems so as to drive said first and second error signals toward a value indicative of said first and second optical beams being substantially overlapped at said first and second optical points; and detecting said first optical beam exiting said second spatial region and detecting said second optical beam exiting said first spatial region, and deriving therefrom differential propagation time between said first and second optical beams propagating between said first and second spatial regions, where said differential propagation time is indicative of flow of said medium.

25. A method for providing an indication of non-reciprocal phase shift imparted upon a pair of counter-propagating optical beams passing through a medium comprising:

comprising the steps of:

generating first and second optical beams;

directing said first and second optical beams in opposite directions along a selected optical path through said medium, where said selected optical path is such that the transit time of said optical beams is affected by the flow of the medium, including the steps of,
   (i) directing said first optical beam through a first optical alignment system such said first optical beam is directed to pass through a first spatial region of said medium and exit a second spatial region of said medium,
   (ii) directing said second optical beam through a second optical alignment system such that said second optical beam is directed to pass through the second spatial region of said medium and exit the first spatial region of said medium; and automatically aligning said first and second optical alignment systems, in response to first and second command signals, respectively, for aligning said first and second optical beams relative to each other such that said first and second optical beams are substantially spatially overlapped at first and second distinct optical points occurring along said selected optical path, wherein the step of automatically aligning said first and second optical beams includes the steps of,
   (i) detecting any portion of said first optical beam exiting said second spatial region of said medium and impinges upon a first detector, and generating a first error signal indicative thereof, where said first error signal is indicative of the degree that said first and second optical beams are spatially overlapped at said first distinct optical point,
   (ii) concurrently detecting any portion of said second optical beam exiting said first spatial region of said medium and impinges upon a second detector, and generating a second error signal indicative thereof, where said second error signal is indicative of the degree that said first and second optical beams are spatially overlapped at said second distinct optical point,
   (iii) generating said first and second command signals in response to said first and second error signals for controlling said first and second optical alignment systems so as to drive said first and second error signals toward a value indicative of said first and second optical beams being substantially overlapped at said first and second optical points; and detecting said first optical beam exiting said second spatial region and detecting said second optical beam exiting said first spatial region, and deriving therefrom differential propagation time between said first and second optical beams propagating between said first and second spatial regions, where said differential propagation time is indicative of flow of said medium.

\* \* \* \* \*